United States Patent [19]
Kashitani et al.

[11] Patent Number: 5,875,042
[45] Date of Patent: Feb. 23, 1999

[54] IMAGE SCANNER

[75] Inventors: Atsushi Kashitani; Hidehiko Kuroda; Satoshi Segawa; Takahiko Tsujisawa, all of Tokyo, Japan

[73] Assignee: NEC Corporation, Tokyo, Japan

[21] Appl. No.: 800,959

[22] Filed: Feb. 18, 1997

[30] Foreign Application Priority Data

Feb. 15, 1996 [JP] Japan ................................. 8-027593

[51] Int. Cl.⁶ ............................... H04N 1/04; H04N 1/36
[52] U.S. Cl. ..................... 358/474; 358/494; 358/497; 358/409; 358/412
[58] Field of Search .................................. 358/497, 494, 358/484, 474, 471, 482, 483, 475, 488, 412, 409, 401, 400, 496, 487, 505, 506, 509, 513; 382/312–315; 364/708.1; 250/208.1, 234–236; 348/203, 206, 202, 96, 98

[56] References Cited

U.S. PATENT DOCUMENTS

| | | | |
|---|---|---|---|
| 5,610,730 | 3/1997 | Osipchuk | 358/494 |
| 5,625,183 | 4/1997 | Kashitani et al. | 358/497 |
| 5,757,518 | 5/1998 | Kashitani | 358/497 |

FOREIGN PATENT DOCUMENTS

| | | |
|---|---|---|
| 62-291259 | 12/1987 | Japan . |
| 2-101862 | 4/1990 | Japan . |
| 8-7073 | 1/1996 | Japan . |

*Primary Examiner*—Edward L. Coles
*Assistant Examiner*—Cheukfan Lee
*Attorney, Agent, or Firm*—Sughrue, Mion, Zinn, Macpeak & Seas, PLLC

[57] ABSTRACT

Disclosed is an image scanner, which has: a reflecting mirror for reflecting a light reflected from a scanned manuscript in a predetermined direction; a sub-scanning means for sequential sub-scanning which parallel moves on a plane which has an acute angle to the surface of the scanned manuscript while keeping the reflecting surface of the reflecting mirror perpendicular to the surface of the scanned manuscript; a focusing lens which focuses the light reflected from the scanned manuscript which is reflected by the reflecting mirror; and an one-dimensional image sensor which outputs a manuscript image by conducting a photoelectric conversion of the light reflected by the reflecting mirror which is focused on a light-receiving surface of the one-dimensional image sensor by the focusing lens.

6 Claims, 6 Drawing Sheets

IMAGE SCANNER

FIELD OF THE INVENTION

This invention relates to an image scanner, and more particularly to, an image scanner used for reading image data from a manuscript.

BACKGROUND OF THE INVENTION

A flat-bed-type image scanner or copier with which a mechanism of correcting an optical path length in sub-scanning is provided is known, for example, as disclosed in Japanese patent application laid-open No.2-101862(1990). FIG. 1A shows a composition of such conventional image scanner. As shown in FIG. 1A, a reflecting mirror 61 reflects a light reflected on a scanned manuscript 60 in the horizontal direction. Reflecting mirrors 62 and 63, which are integrated with each other, allow the reflected light from the reflecting mirror 61 to be turned in the reverse direction. The reflected light from the reflecting mirror 63 is then transmitted through a focusing lens 64, forming an image on an one-dimensional image sensor 65.

In sub-scanning, the reflecting mirror 61 is parallel moved in the direction as shown by an arrow in FIG. 1A to sequentially scan the manuscript 60. At this time, since the unit composed of the reflecting mirrors 62, 63 is parallel moved by half the distance that the reflecting mirror 61 is parallel moved in the same direction, the optical path length from the scanned manuscript 60 to the one-dimensional image sensor 65 can be constant.

On the other hand, known in a conventional flat-bed-type image scanner or copier are a manner that a unit 66 in which a reflecting mirror, a focusing lens and an one-dimensional image sensor are integrated is, as shown in FIG. 1B, parallel moved to a scanned manuscript 60, and a manner that a unit in which a focusing lens 64 and an one-dimensional image sensor 65 are integrated and to which a light reflected on a scanned manuscript 60 is led through reflecting mirrors 61, 67 and 68 is, as shown in FIG. 1C, parallel roved with the parallel movement of the reflecting mirror 61 to the manuscript 60.

Furthermore, Japanese patent application laid-open No.62-291259(1987) discloses an image scanner in which a reflecting mirror is rotated to scan a manuscript and an one-dimensional image sensor reads the image data and with which a mechanism of correcting an optical path length is provided. In this image scanner, the rotation of the reflecting mirror and the parallel movement of an focusing lens and the one-dimensional image sensor are conducted by using a cam mechanism.

A unit in which the reflecting mirror, focusing lens and one-dimensional image sensor are fixed is pressed against a slide plane of the cam by a spring. The cam is composed of two slide planes, where one is used for the reflecting mirror and the other is used for the unit composed of the focusing lens and the one-dimensional image sensor. The slide planes are designed such that the reflecting mirror is driven by a predetermined angle and the unit of the focusing lens and one-dimensional image sensor is driven by a predetermined distance of parallel movement. Rotating the cam by, for example, a stepping motor, the reflecting mirror and the unit of the focusing lens and one-dimensional image sensor can be simultaneously driven.

Japanese patent application laid-open No.8-7073(1996) discloses another image sensor in which a reflecting mirror is rotated to scan a manuscript and an one-dimensional image sensor reads the image data. However, this image scanner is not provided with an optical path length correcting mechanism by which an optical path length from an one-dimensional image sensor to a reading surface is corrected to be constant. Therefore, the image to be read may have a barrel distortion.

However, in the conventional techniques as shown in FIGS. 1A and 1C, there are problems that the driven units and drive mechanism are complicated and that the entire device becomes thicker since the optical path is turned. Also, in the image scanner shown in FIG. 1B, there are problems that the miniaturization of the driven unit is limited and that, when the driven unit is miniaturized, the optical path length becomes shorter, therefore making the designing of optical system difficult. Furthermore, there is a common problem that the image scanners in FIGS. 1A to 1C require a high torque and a high precision of the drive mechanism.

On the other hand, the optical path length correcting mechanism with the cam as disclosed in Japanese patent application laid-open No.62-291259(1987), since the reflecting mirror and the unit of the focusing lens and one-dimensional image sensor are pressed against the slide plane of the cam by the spring, requires a relatively high torque of a drive means such as a stepping motor. Furthermore, there is a problem that, with the increase in the distance of parallel movement for correcting an optical path length and the increase in the rotation angle of the reflecting mirror, the size of the cam needs to be larger in the two-dimensional directions.

SUMMARY OF THE INVENTION

Accordingly, it is an object of the invention to provide an image scanner in which a torque required of a drive mechanism can be lowered.

It is a further object of the invention to provide an image scanner in which a desired reading resolution can be obtained in a desired range without increasing a precision of drive mechanism.

It is a still further object of the invention to provide an image scanner which can be miniaturized when it is not used.

According to the invention, an image scanner, comprises:
a reflecting mirror for reflecting a light reflected from a scanned manuscript in a predetermined direction;
a sub-scanning means for sequential sub-scanning which parallel moves on a plane which has an acute angle to the surface of the scanned manuscript while keeping the reflecting surface of the reflecting mirror perpendicular to the surface of the scanned manuscript;
a focusing lens which focuses the light reflected from the scanned manuscript which is reflected by the reflecting mirror; and
an one-dimensional image sensor which outputs a manuscript image by conducting a photoelectric conversion of the light reflected by the reflecting mirror which is focused on a light-receiving surface of the one-dimensional image sensor by the focusing lens.

According to another aspect of the invention, an image scanner, comprising:
a first reflecting mirror for reflecting a light reflected from a scanned manuscript in a predetermined direction;
a sub-scanning means for sequential sub-scanning which parallel moves on a plane which has an acute angle to the surface of the scanned manuscript while keeping the reflecting surface of the first reflecting mirror perpendicular to the surface of the scanned manuscript;

a second reflecting mirror for reflecting the light reflected by the first reflecting mirror, wherein the second reflecting mirror is fixed at a position, a focusing lens which focuses the light reflected by the second reflecting mirror; and an one-dimensional image sensor which outputs a manuscript image by conducting a photoelectric conversion of the light reflected by the second reflecting mirror which is focused on a light-receiving surface of the one-dimensional image sensor by the focusing lens.

According to a further aspect of the invention, an image scanner, comprising:

a first reflecting mirror for reflecting a light reflected from a scanned manuscript in a predetermined direction;

a sub-scanning means for sequential sub-scanning which parallel moves on a plane which has an acute angle to the surface of the scanned manuscript while keeping the reflecting surface of the first reflecting mirror perpendicular to the surface of the scanned manuscript;

a second reflecting mirror for reflecting the light reflected by the first reflecting mirror, wherein the second reflecting mirror is fixed at a position, a focusing lens which focuses the light reflected by the second reflecting mirror;

an one-dimensional image sensor which outputs a manuscript image by conducting a photoelectric conversion of the light reflected by the second reflecting mirror which is focused on a light-receiving surface of the one-dimensional image sensor by the focusing lens;

a housing which includes a folding mechanism by which the housing is foldable to accommodate the sub-scanning means, the second reflecting mirror, the focusing lens and the one-dimensional image sensor which are fixed on the housing; and a drive circuit which drives the sub-scanning means and the one-dimensional image sensor, the drive circuit being fixed on the housing;

wherein, when the image scanner is not used, the sub-scanning means, the second reflecting mirror, the focusing lens, the one-dimensional image sensor and the drive circuit are accommodated with the first reflecting mirror in a space where the first reflecting mirror moves.

BRIEF DESCRIPTION OF THE DRAWINGS

The invention will be explained in more detail in conjunction with the appended drawings, wherein.

DESCRIPTION OF THE PREFERRED EMBODIMENTS

An image scanner in the first preferred embodiment will be explained in FIG. 2.

Figure 1A:
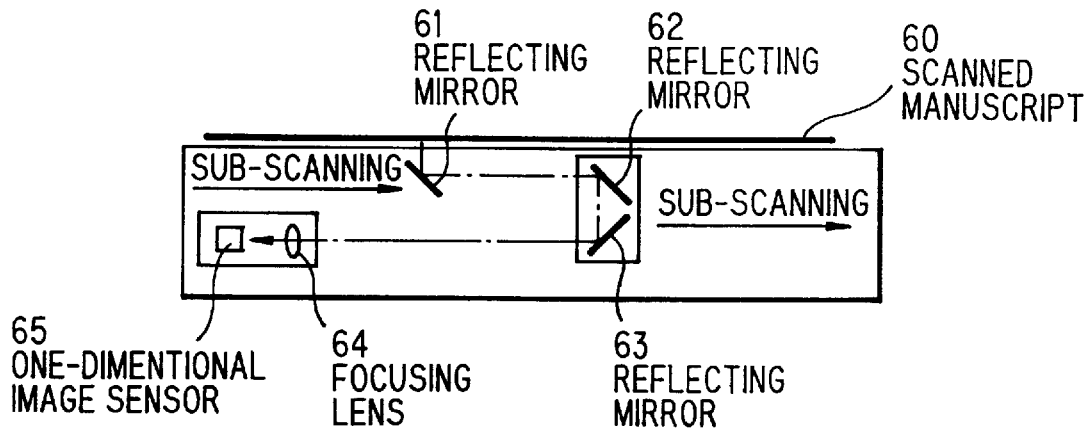
FIGS. 1A to 1C show different compositions of conventional image scanners.
Figure 1B:
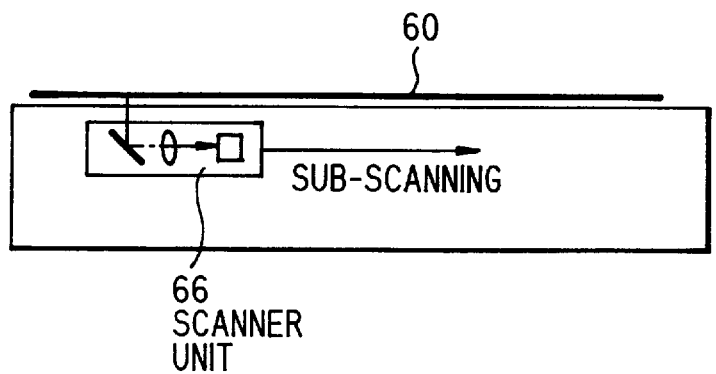
Figure 1C:
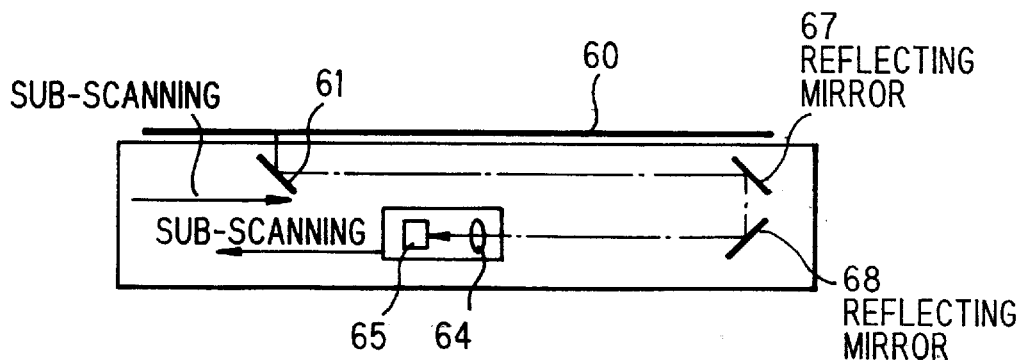
Figure 2:
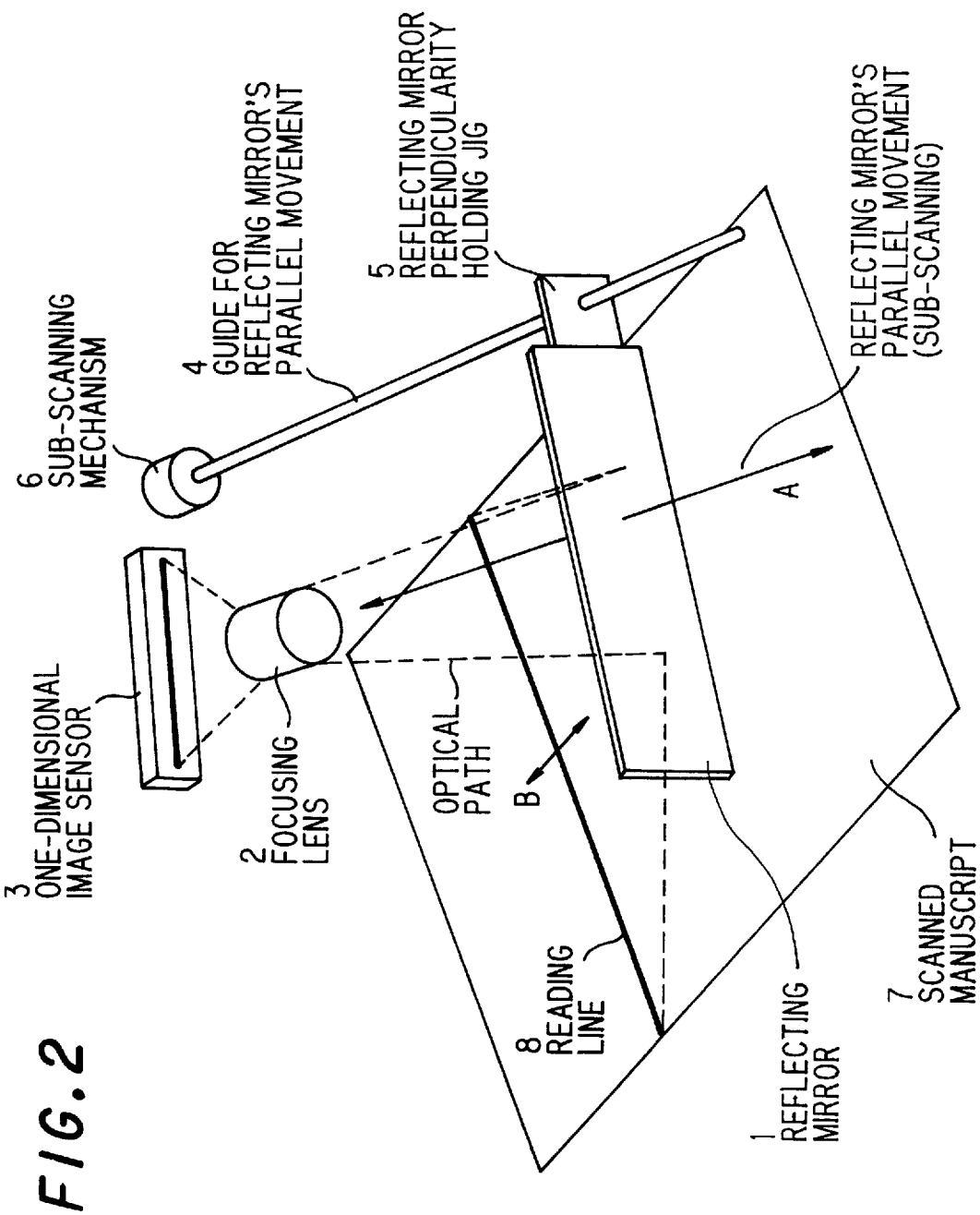
FIG. 2 shows a composition of an image scanner in a first preferred embodiment according to the invention.

As shown in FIG. 2, a reflecting mirror 1 is held by a reflecting mirror perpendicularity holding jig 5 such that a reflecting surface thereof is kept to be perpendicular to the surface of a scanned subscript 7. The reflecting mirror 1, a focusing lens 2 and an one-dimensional image sensor 3 are disposed on a straight line which has an angle $\theta$ as to the scanned subscript 7. A guide 4 for reflecting mirror's parallel movement and the reflecting mirror perpendicularity holding jig 5 compose a ball screw, where the reflecting mirror parallel movement guide 4 is a male screw and the reflecting mirror perpendicularity holding jig 5 is a female screw. As a sub-scanning mechanism 6, for example, a stepping motor can be used. The reflecting mirror parallel movement guide 4 has an angle $\theta$ to the scanned manuscript 7.

In operation, a light reflected on a reading line 8 of the scanned manuscript 7 is reflected by the reflecting mirror 1, then focused through the focusing lens 2 on the one-dimensional image sensor 3, thereby a partial one-dimensional image as to the reading line 8 being formed via a photoelectric conversion. On the other hand, by rotating the reflecting mirror parallel movement guide 4 that is the ball male screw, the sub-scanning mechanism 6 can be parallel moved on a plane that has the angle $\theta$ to the scanned manuscript 7, i.e., in the direction of an arrow A in FIG. 2.

Thus, the reflecting mirror 1 is parallel moved on the plane that has the angle $\theta$ to the surface of the scanned manuscript 7 while keeping the reflecting surface perpendicular to the surface of the scanned manuscript 7, thereby the reading line 8 being moved in the direction of an arrow B on the scanned manuscript 7. Accordingly, a partial image of the reading line 8 that moves in the direction of the arrow B is sequentially obtained by the one-dimensional image sensor 3, thereby obtaining a two-dimensional image of the scanned manuscript 7 in which these partial images are synthesized.

Figure 3:
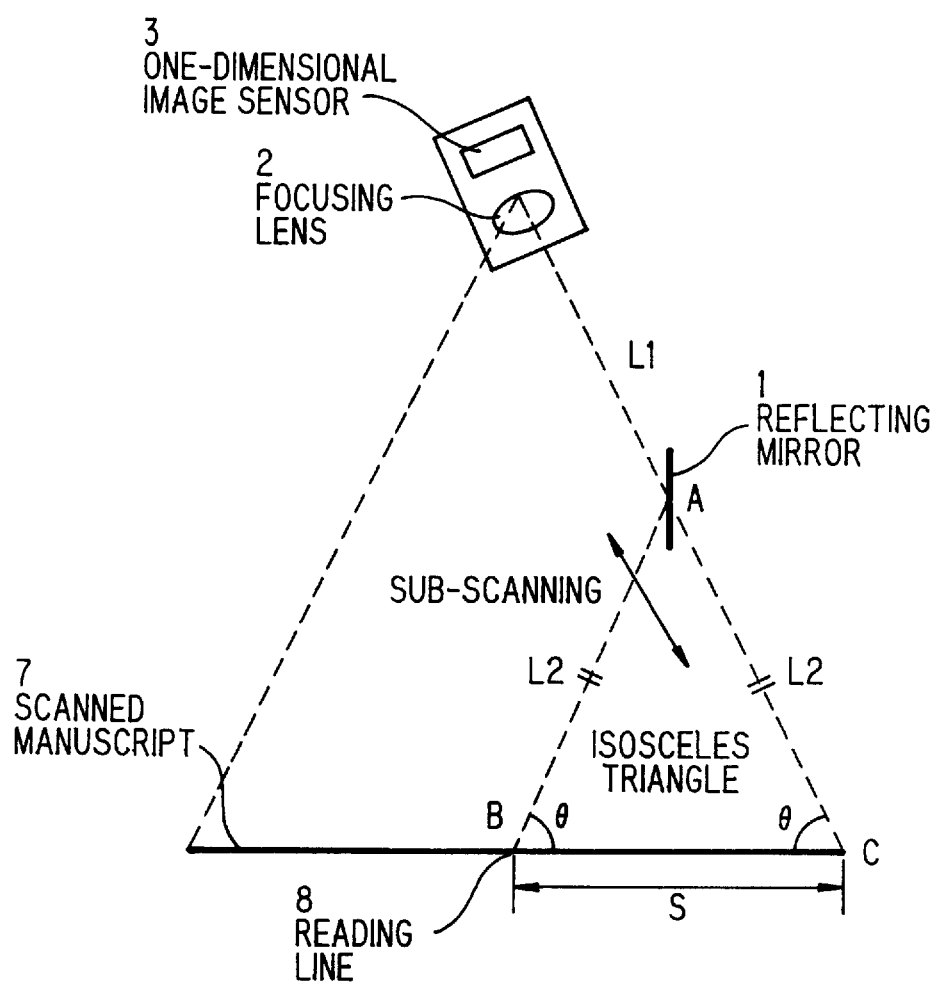
FIG. 3 shows the composition of the image scanner in the first embodiment in the case that it is seen from a lateral position

FIG. 3 shows the composition of the first embodiment in the case that it is seen from a lateral position. As clearly shown in FIG. 3, the reflecting mirror 1 is parallel moved on the plane that has the angle $\theta$ to the scanned manuscript 7. Thereby, the reading line 8 is moved on the scanned manuscript 7, i.e., being sub-scanned. Since the reflecting mirror 1 is parallel moved while keeping the reflecting surface perpendicular to the surface of the scanned manuscript 7, a triangle ABC in FIG. 3, which has three apogees located on the reading line 8, the reflecting surface of the reflecting mirror 1 and the intersecting line of the reflecting mirror parallel movement guide 4 and the surface of the scanned manuscript 7, is formed as an isosceles triangle. Therefore, the optical path length L from the focusing lens 2 to the reading line 8 is represented as:

$$L = L1 + L2 = \text{(constant)}.$$

On the other hand, if the amount of movement of the reflecting mirror 1 as to the scanned manuscript 7 is x, the amount s of movement of the reading line 8 is, as seen from FIG. 3, given by:

$$s = 2\cos\theta \cdot x$$

Then, differentiating the above expression, the next expression is obtained.

$$ds = 2\cos\theta \cdot dx$$

where dx represents a positioning resolution capability of the sub-scanning mechanism 6 and ds represents a sub-scanning width per a main scanning. The reading length in the sub-scanning direction is given by:

$$s_{max}=2\cos\theta\cdot L$$

Accordingly, by varying only the angle θ while keeping the positioning precision of the sub-scanning mechanism 6 as it is, the range of sub-scanning and the resolution can be controlled. Namely, if θ=60°, then, ds=dx and $s_{max}$=L,
if θ>60°, then, ds<dx and $s_{max}$<L, and
if θ<60°, then, ds>dx and $s_{max}$>L.

Thus, in the first embodiment, in case of θ>60°, the reading of a narrow range with a high resolution can be performed, and, in case of θ<60°, the reading of a wide range with a low resolution can be performed. Meanwhile, θ is in the range of an angle less than 90° and more than 0°.

In the first embodiment, since the constant optical path length from the one-dimensional image sensor 3 to the surface of the scanned manuscript 7 in sub-scanning can be given by the parallel movement of only the reflecting mirror 1, the driven unit can be significantly lightened, thereby allowing the driving mechanism to have a low torque, a low consumed power and a small size.

Figure 4:
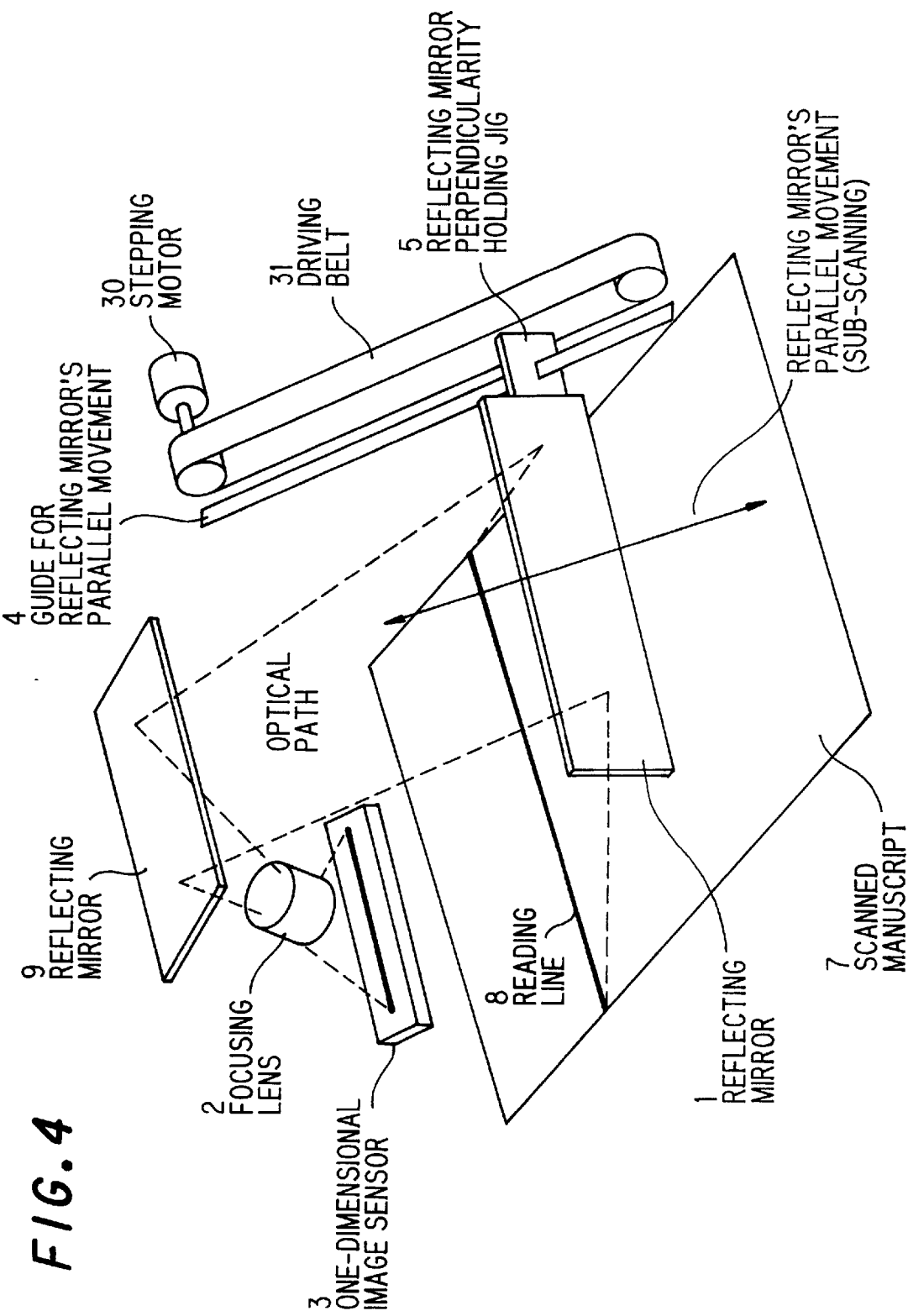
FIG. 4 shows a composition of an image scanner in a second preferred embodiment according to the invention.

An image scanner in the second preferred embodiment will be explained in FIG. 4, wherein like parts are indicated by like reference numerals as used in FIG. 2.

In the second embodiment, as a sub-scanning mechanism, a stepping motor 30 and a driving belt 31 are used. Furthermore, a second reflecting mirror 9 is disposed and fixed at a position where a light reflected on the reflecting mirror 1 can be led to the focusing lens 2. The reflecting mirror parallel movement guide 4 is composed of a rail or a shaft along which the reflecting mirror 1 car be parallel moved. The reflecting mirror perpendicularity holding jig 5 is provided with a hole into which the reflecting mirror parallel movement guide 4 can be fitted.

In the second embodiment, since the driving belt 31 is used in the sub-scanning mechanism, the reflecting mirror 1 can be driven at a speed higher than that in the first embodiment, while the increase in resolution is limited to some degree.

In operation, a light reflected on the reading line 8 is reflected on the reflecting mirror 1, further reflected on the reflecting mirror 9. While the reflecting mirror 1 is parallel moved by the stepping motor 30 and driving belt 31, the reflecting mirror 9 is fixed. The light reflected on the reflecting mirror 9 is then focused through the focusing lens 2 on the one-dimensional image sensor 3.

Figure 5:
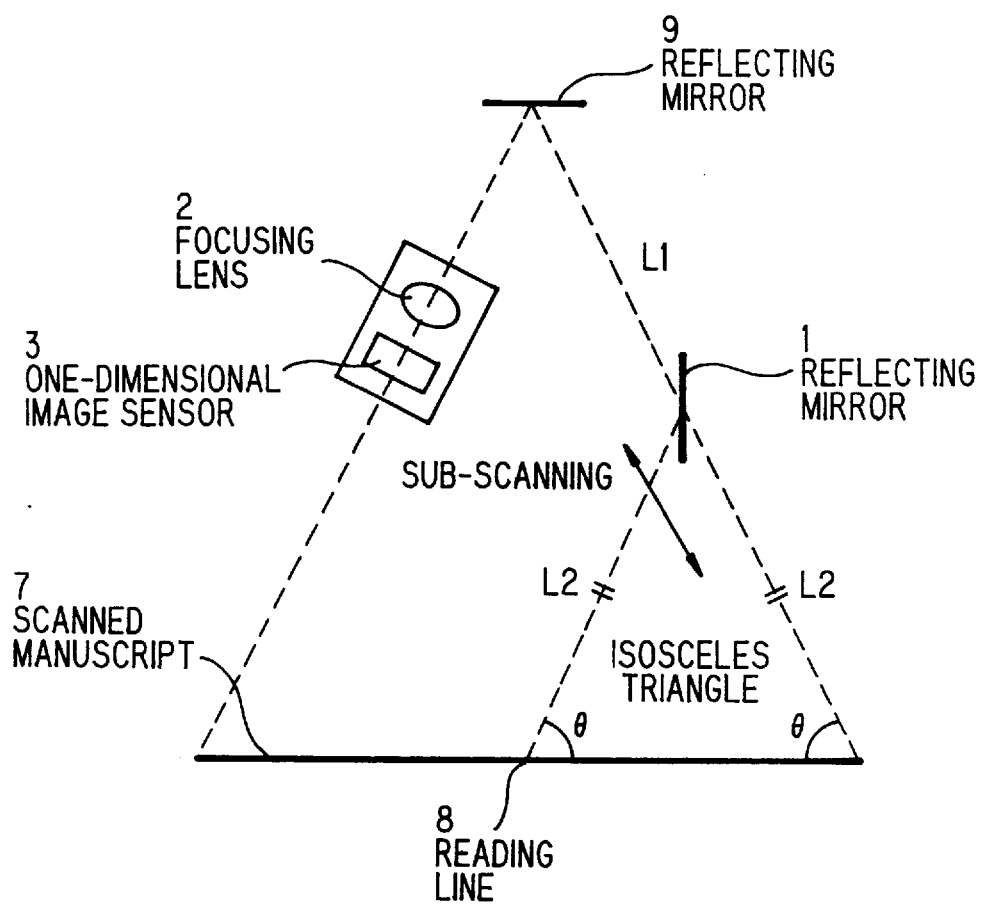
FIG. 5 shows the composition of the image scanner in the second embodiment in the case that it is seen from a lateral position.

FIG. 5 shows the composition of the second embodiment in the case that it is seen from a lateral position. In the comparison of FIGS. 3 and 5, it will be appreciated that, though a reflecting mirror is added and the position and direction of the focusing lens and one-dimensional image sensor are changed, there is no variation of the optical path length during the parallel movement of the reflecting mirror 1. Thus, also in the second embodiment, since the constant optical path length from the one-dimensional image sensor 3 to the surface of the scanned manuscript 7 in sub-scanning can be given by the parallel movement of only the reflecting mirror 1, the driven unit can be significantly lightened, thereby allowing the driving mechanism to have a low torque, a low consumed power and a small size.

Figure 6A:
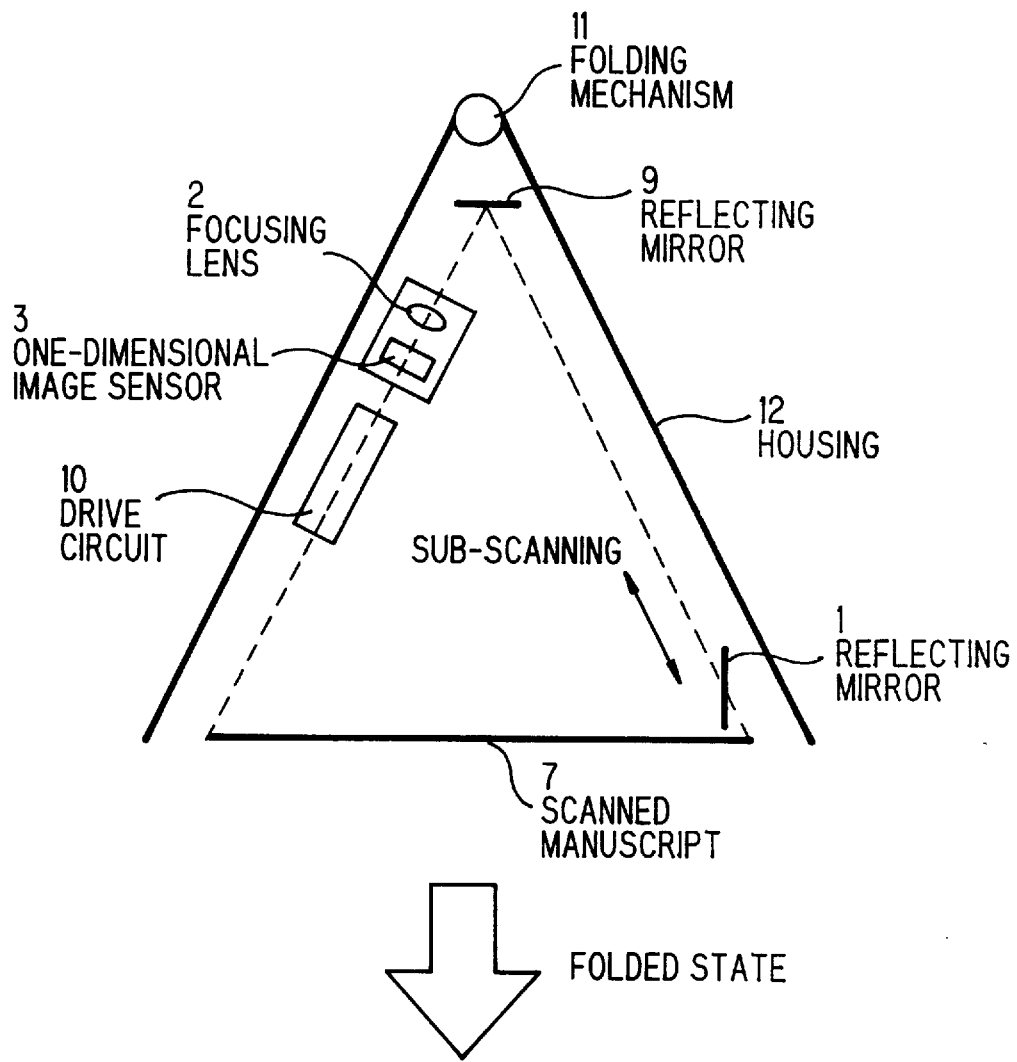
FIGS. 6A and 6B show a composition of an image scanner in a third preferred embodiment according to the invention.
Figure 6B:
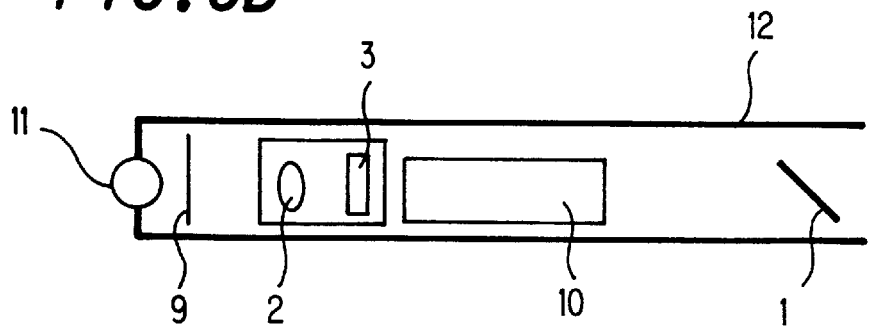

FIGS. 6A and 6B show a composition of the third embodiment, which is obtained by modifying the composition in the second embodiment, in the case that it is seen from a lateral position, wherein FIG. 6A shows a state that it is used and FIG. 6B shows a state that is not used. As shown in FIGS. 6A and 6B, a unit including the focusing lens 2 and one-dimensional image sensor 3 is fixed on a housing 12. Though it is not shown, the reflecting mirror parallel movement guide 4 and stepping motor 30 as explained in the second embodiment are also fixed on the housing 12. A drive circuit 10, which is used for driving the one-dimensional image sensor 3 and stepping motor 30, is also fixed on the housing 12.

The housing 12 can be fixed at a desired angle by using a folding mechanism 11, i.e., the angle θ as explained in the first embodiment can be changed free. When the image scanner is used, as shown in FIG. 6A, it has the composition similar to that in the second embodiment. Here, the reflecting mirror 1 is scanned in the sub-scanning direction as in the second embodiment, thereby a two-dimensional image of the scanned manuscript 7 being obtained by the one-dimensional image sensor 3.

When it is not used, as shown in FIG. 6B, the housing 12 is folded by the folding mechanism 11. In this state, the reflecting mirror 1 is located at an end of the housing 12 and the focusing lens 2, one-dimensional image sensor 3 and drive circuit 10 are accommodated in a space where the reflecting mirror 1 is parallel moved. Thus, in the third embodiment, when the image scanner is not used, the entire thickness can be significantly reduced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An image scanner, comprising:

a reflecting mirror for reflecting a light reflected from a scanned manuscript in a predetermined direction;

a sub-scanning means for sequential sub-scanning which parallel moves on a plane which has an acute angle to the surface of said scanned manuscript while keeping the reflecting surface of said reflecting mirror perpendicular to the surface of said scanned manuscript;

a focusing lens which focuses said light reflected from said scanned manuscript which is reflected by said reflecting mirror; and an one-dimensional image sensor which outputs a manuscript image by conducting a photoelectric conversion of said light reflected by said reflecting mirror which is focused on a light-receiving surface of said one-dimensional image sensor by said focusing lens.

2. An image scanner, according to claim 1, wherein:

said sub-scanning means comprises a holding jig which holds said reflecting surface of said reflecting mirror to always be perpendicular to said surface of said scanned manuscript, a movement guide which sets said acute angle to be in an angle range more than 0° and less than 90°, and a sub-scanning mechanism which moves said reflecting mirror and said holding jig along said movement guide.

3. An image scanner, comprising:

a first reflecting mirror for reflecting a light reflected from a scanned manuscript in a predetermined direction;

a sub-scanning means for sequential sub-scanning which parallel moves on a plane which has an acute angle to the surface of said scanned manuscript while keeping the reflecting surface of said first reflecting mirror perpendicular to the surface of said scanned manuscript;

a second reflecting mirror for reflecting said light reflected by said first reflecting mirror, wherein said second reflecting mirror is fixed at a position, a focusing lens which focuses said light reflected by said second reflecting mirror; and an one-dimensional image sensor which outputs a manuscript image by conducting a photoelectric conversion of said light reflected by said second reflecting mirror which is focused on a light-receiving surface of said one-dimensional image sensor by said focusing lens.

4. An image scanner, according to claim 3, wherein:

said sub-scanning means comprises a holding jig which holds said reflecting surface of said reflecting mirror to always be perpendicular to said surface of said scanned manuscript, a movement guide which sets said acute angle to be in an angle range more than 0° and less than 90°, and a sub-scanning mechanism which moves said first reflecting mirror and said holding jig along said movement guide.

5. An image scanner, comprising:

a first reflecting mirror for reflecting a light reflected from a scanned manuscript in a predetermined direction;

a sub-scanning means for sequential sub-scanning which parallel moves on a plane which has an acute angle to the surface of said scanned manuscript while keeping the reflecting surface of said first reflecting mirror perpendicular to the surface of said scanned manuscript;

a second reflecting mirror for reflecting said light reflected by said first reflecting mirror, wherein said second reflecting mirror is fixed at a position, a focusing lens which focuses said light reflected by said second reflecting mirror;

an one-dimensional image sensor which outputs a manuscript image by conducting a photoelectric conversion of said light reflected by said second reflecting mirror which is focused on a light-receiving surface of said one-dimensional image sensor by said focusing lens;

a housing which includes a folding mechanism by which said housing is foldable to accommodate said sub-scanning means, said second reflecting mirror, said focusing lens and said one-dimensional image sensor which are fixed on said housing; and a drive circuit which drives said sub-scanning means and said one-dimensional image sensor, said drive circuit being fixed on said housing;

wherein, when said image scanner is not used, said sub-scanning means, said second reflecting mirror, said focusing lens, said one-dimensional image sensor and said drive circuit are accommodated with said first reflecting mirror in a space where said first reflecting mirror moves.

6. An image scanner, according to claim 5, wherein:

said sub-scanning means comprises a holding jig which holds said reflecting surface of said reflecting mirror to always be perpendicular to said surface of said scanned manuscript, a movement guide which sets said acute angle to be in an angle range more than 0° and less than 90°, and a sub-scanning mechanism which moves said first reflecting mirror and said holding jig along said movement guide.

* * * * *